Oct. 7, 1969                R. D. REIS                3,470,909
                        PILOT CONTROL VALVE
Filed Nov. 8, 1966                              2 Sheets-Sheet 1
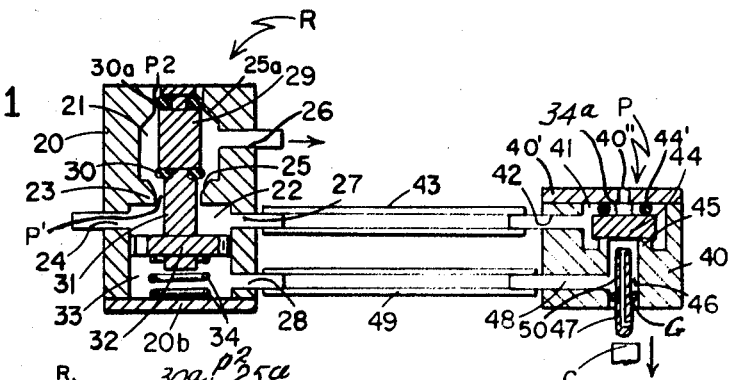
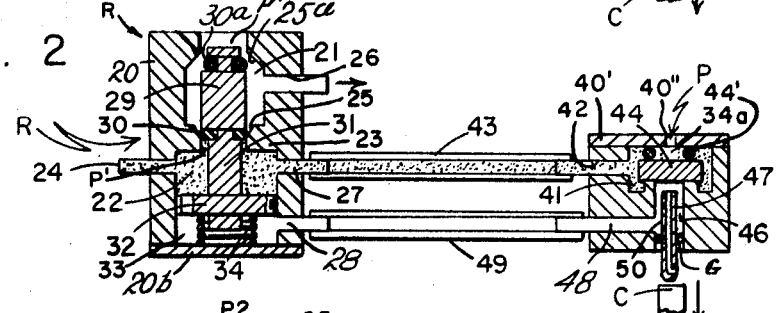
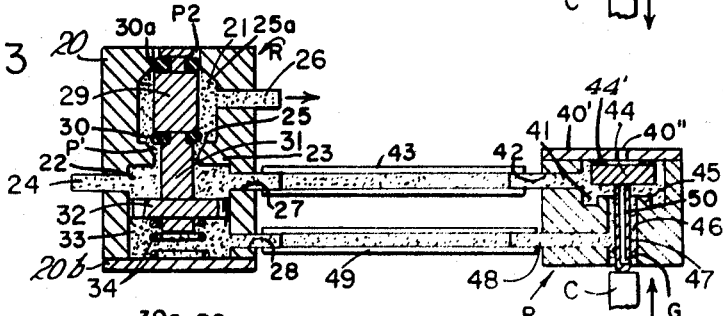
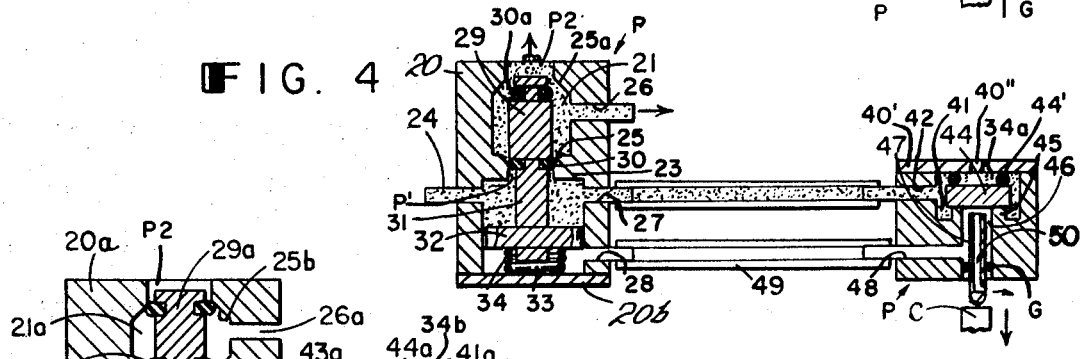
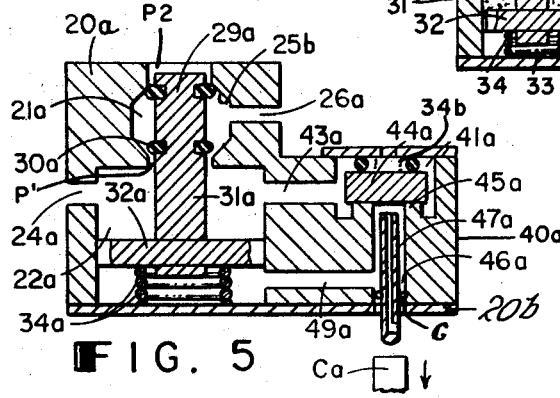
Inventor
Robert D. Reis
by Roberts, Cushman & Grover
Attys

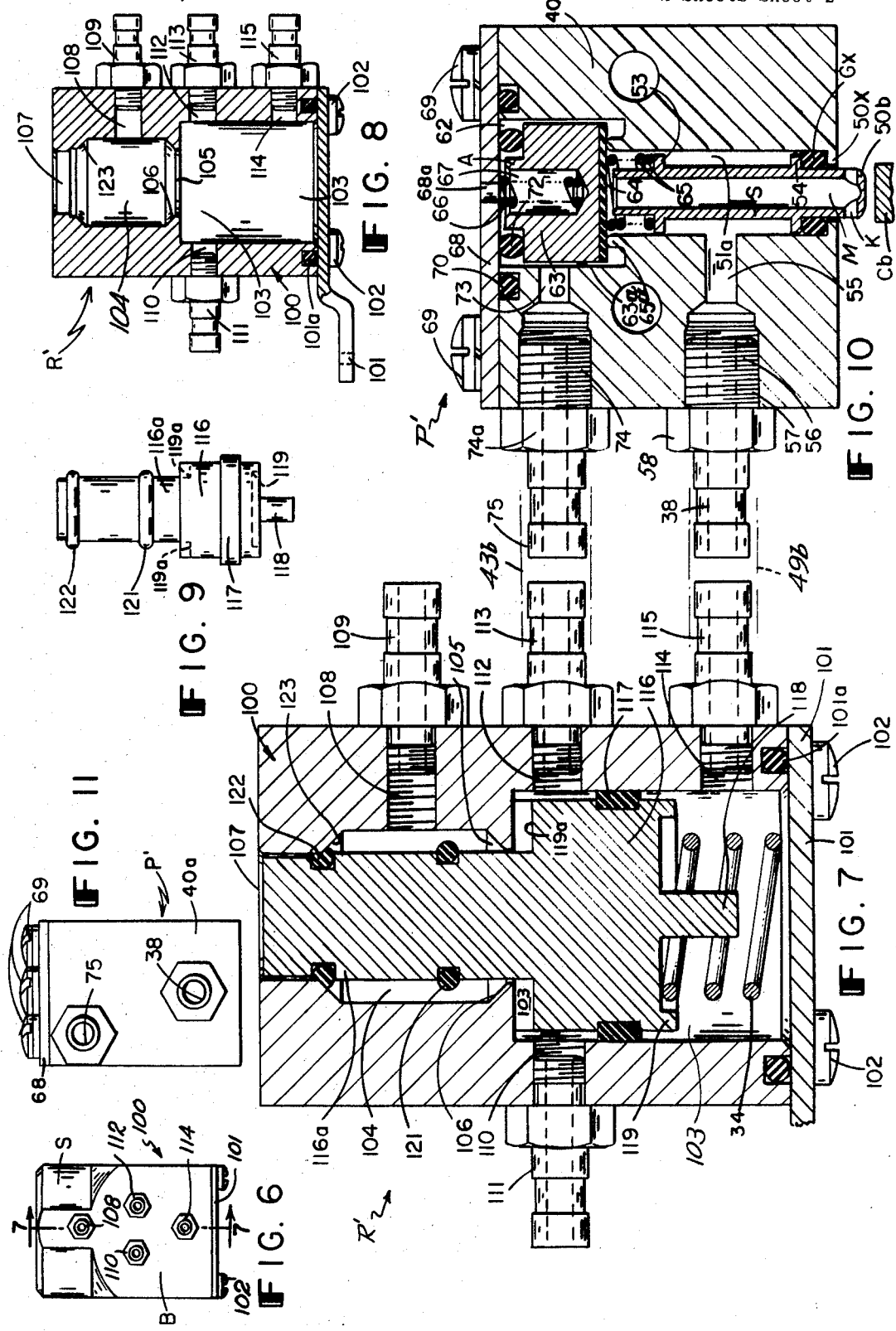

United States Patent Office 3,470,909
Patented Oct. 7, 1969

1

3,470,909
PILOT CONTROL VALVE
Robert D. Reis, Hingham, Mass., assignor to United Electric Controls Company, Watertown, Mass., a corporation of Massachusetts
Filed Nov. 8, 1966, Ser. No. 592,912
Int. Cl. F15b *13/042*
U.S. Cl. 137—625.6                                10 Claims

ABSTRACT OF THE DISCLOSURE

A valve assembly comprising a normally open valve adapted to be closed by the pressure of a pressure fluid at one side thereof when connected to a source of fluid pressure, and a normally closed pilot valve adapted when unseated to supply pressure fluid to the opposite side of the valve to open the same.

---

Objects of the invention are to provide a valve device having the above characteristics which is very simple; includes but few movable parts; which is rugged and capable of withstanding high pressures which is reliable in action even though it be employed for the control of fluid within an extreme range of temperatures; and which is sensitive in action so as to respond to very slight changes in the position of the control element.

Other and further objects and advantages of the invention will be pointed out in the following more detailed description and by reference to the accompanying drawings wherein:

FIG. 1 is a diagrammatic, vertical section illustrative of the principle of the invention and showing the essential elements of the valve device as they are relatively positioned in the absence of any pressure fluid;

FIG. 2 is a view similar to FIG. 1, but showing the elements in the relative positions which they occupy when primed with pressure fluid;

FIG. 3 is a similar view showing the result of the opening of the pilot valve in response to the operation of the control element;

FIG. 4 is a similar view showing the relative arrangement of the elements, immediately following the cessation of demand for pressure fluid by the user device;

FIG. 5 is a view illustrative of a slight modification of the structure shown in FIGS. 1 to 4, diagrammatically showing all of the elements which may be housed in a single casing rather than in two separate casings connected by pipes or conduits as in FIGS. 1 to 4;

FIG. 6 is a side elevation of the main valve unit as actually constructed;

FIG. 7 is a vertical section on the line 7—7 of FIG. 6, showing the main valve unit, to much larger scale, but with a slight modification;

FIG. 8 is a vertical section, in the same plane as FIG. 7, but to smaller scale, showing the casing only of the main valve unit;

FIG. 9 is an elevation of the valve-actuating piston of the main valve unit removed from the casing;

FIG. 10 is a vertical section of the pilot valve unit, to the same scale as FIG. 7, as actually constructed; and FIG. 11 is an elevation of the pilot valve unit, as viewed from the left-hand side of FIG. 10, but to smaller scale.

In the attainment of the above objects, the invention provides valve apparatus including a main valve unit comprising a valve head, which is seated, so long as the user device (which is to be supplied with pressure fluid) is making no demand for pressure fluid, by the action of pressure exerted by the fluid itself, and wherein a pilot valve unit, sensitively responsive to varying demands for pressure fluid by said user device, in responding, to such a demand, upsets the balance of forces in the main valve unit in such a way that the valve instantly opens to full capacity. On the other hand, in response to a cessation of demand for pressure fluid by said user device, the pilot valve acts to restore the initial balance of forces, with resultant complete closure of the main valve.

Referring to the drawings and in particular to diagrammatic FIGS. 1 to 4, inclusive, wherein minor constructional details are omitted, the character R designates the main valve unit of the improved valve apparatus, while the character P designates the pilot valve unit. The casing of the main unit R is designated in FIGS. 1 to 4 by the numeral 20, this casing including a bottom member 20b and having the internal chambers 21 and 22 with an intervening web member 23 having a port P' (FIG. 1) which is defined by an annular valve seat 25, and an exhaust port P2 defined by the annular seat 25a (FIG. 2).

Within the upper or delivery chamber 21 there is arranged a valve head 29 provided with spaced O-rings 30 and 30a for making leak-tight contact with the seats 25 and 25a respectively. The valve head 29, or an extension thereof, extends down through the port P' and has connected to its lower portion 31 a piston 32, desirably having a leak-tight packing (not shown) at its peripheral surface for engagement with the inner surface of the wall of the chamber 22. Below the piston there may be arranged a coiled compression spring 34. This spring may be such as to function mainly as a cushion to prevent slamming of the valve in closing, or it may be such as constantly to exert an upward force tending to place the piston and the valve head 29 in the position shown in FIG. 1.

From the chamber 21 a delivery port 26 opens through the wall of the casing and from the chamber 22, or at least that part of the chamber 22 which is above the piston 32, there is an inlet port 24 in the wall of the casing while an outlet port 27 (shown in FIG. 1 as diametrically opposite the port 24) also extends through the wall of the casing. From the space within the casing, below the piston, a port 28 extends through the wall of the casing.

Since the diameter of the head 29 is substantial as compared with that of the piston 32 and since, when the value is closed, as shown in FIG. 1, the upper end of the head 29 is not exposed to the fluid pressure in chamber 21, the effective area on the upper surface of the piston is substantially less than that of its undersurface. When the spring is omitted, the valve head is sustained in the open position of FIG. 1, solely by the force exerted by the O-ring 30a which, at this time, is compressed between the upper end of the head 29 and the wall of the port P2. If a spring is arranged beneath the piston, as shown at 34 in FIG. 1, this spring may be arranged to exert some upward force, for example merely to assist in sustaining the valve in its open position, or it may exert substantial force opposing closure of the valve.

The pilot valve unit P comprises a casing 40 (FIG. 1) having an internal chamber 41 and cover 40' containing a vent 40". A port 42 extends out through the wall of the casing and is connected to a conduit 43 which leads to the port 27 in the main valve casing as above preferred to. Within the chamber 41 there is a disc-like valve block 44 which, when seated, rests upon an annular valve seat 45 and thus prevents the escape of pressure fluid from the chamber 41 downwardly into a vertically elongate cylindrical chamber 46 which extends to the bottom of the casing. An O-ring 44' of resilient material resting upon the upper surface of the valve block 44 and in contact with the lower surface of the cover 40' prevents leakage between the valve block and a pressure relief port 40" in the cover. A tubular motion-transmitting rod 47, arranged within the chamber 46, is embraced by an O-ring G, and protrudes from the bottom of the casing in position to be contacted by a vertically movable control element C, when the latter is raised from the inactive position shown in FIG. 1. A port 48 in the wall of the chamber 46 communicates, by means of a conduit 49, with the port 28 of the main valve. A compression spring 34a within the chamber 41 urges the valve block 44 downwardly toward its seat. The lower end of tubular rod 47 communicates with the atmosphere, when its valve is open, as shown in FIG. 1, so that the under surface of the piston 32 is exposed to atmospheric pressure.

In FIG. 2 the several elements are designated by the same numerals as in FIG. 1, but, as shown in this view, pressure fluid (indicated by the stippling) has entered the chamber 22 and, pressing down upon the upper surface of the piston 32, has compressed the spring 34 and has seated the O-ring 30 of the valve head 29 against its seat 25, thus shutting off the chamber 21 from the pressure fluid while opening the port P2. However, pressure fluid has passed through the conduit 43 into the chamber 41 of the pilot valve unit P, but, since the valve block 44 is seated, the pressure fluid has not been able to enter the chamber 46 of the pilot valve. The control element C is still in the down position which means that, as yet, the user device which is to be supplied with pressure fluid, through this novel valve apparatus, is not calling for more pressure fluid.

In FIG. 3 the parts are again designated by the same numerals, but as here shown the control element C has moved upwardly and has contacted the lower end of the motion-transmitting element 47 and has raised the latter and contacted its upper end with the valve block 44 and has lifted the latter from its seat 45, thus allowing pressure fluid from the chamber 41 to flow down through the chamber 46 and through the port 48 into the conduit 49 and thence into that part of the chamber 22 of the main valve which is below the piston 32, thus building up pressure beneath the piston. When the unit fluid pressure above and below the piston is the same, the effective upward force exceeds the downward force and raises the valve head 29 to full open position (while concomitantly seating the O-ring 30a and closing port P2), so permitting pressure fluid to enter the chamber 21 and flow out through the delivery port 26, from which the pressure fluid may be carried by means (not here shown) to the user device which is calling for pressure fluid.

When the user device no longer requires pressure fluid the control device C will move downwardly, thus allowing the element 47 to move down; the valve block 44 to seat, cutting off pressure fluid from the space below the piston 32. As the valve block 44 seats, the element 47 drops back to the position of FIG. 2 thus opening the axial passage 50 in element 47 to the chamber 46. Pressure fluid trapped in the space below the piston 32 may flow back through the conduit 49 and escape downwardly through the axial passage 50 (FIG. 4) in the motion-transmitting part 47, so as to escape to the atmosphere. The under side of piston 32 is now exposed to atmospheric pressure. Since the upper surface of the piston 32 is still exposed to full fluid pressure, the piston at once moves down carrying with it the valve head 29 which is in this way seated, cutting off pressure fluid from the chamber 21 and thus terminating its delivery to the user device. As the valve head 29 moves down, the port P2 is opened and thus pressure fluid, trapped in the chamber 21, is permitted to escape.

In the device as shown in FIG. 5, the main valve unit and the pilot unit are shown as embodied in a single structure having the casing 20a which is shaped to provide the upper chamber 21a and the lower chamber 22a, with the annular valve seat 25b, defining a port providing communication between the upper and lower chambers. The valve head 29a in the upper chamber has the O-ring 30a to make leak-tight contact with the valve seat 25b and the motion-transmitting portion 31a extending down through the valve port and secured to the piston 32a, and the spring 34a beneath the piston and exerting force urging the piston upwardly and tending to unseat the valve head. A supply port 24a in the casing wall admits pressure fluid to the chamber 22a and a port 26a permits pressure fluid to discharge from the chamber 21a. A passage 43a leads from the chamber 22a to a chamber 41a within a part 40a which houses a pilot valve block 44a urged downwardly by a spring 34b to make leak-tight contact with an annular seat 45a. A motion-transmitting rod 47a extends, with clearance, through a chamber 46a and has its lower end exposed below the casing and in position to be contacted by the control element Ca. From the chamber 46a a passage 49a extends to a chamber 33a below the piston 32a. The operation of this device is identical with that disclosed in FIGS. 1 to 4, as above described.

In FIGS. 6 to 10, inclusive, the valve apparatus of the present invention is shown in detail, substantially as it is actually manufactured for sale; FIG. 6 showing a desirable external configuration for the main valve unit. This unit comprises a casing 100 (FIGS. 6, 7 and 8) which, as here illustrated, comprises a unitary main portion and a separate base member 101 which is secured to the body portion, for example, by screws or bolts 102. The body portion of this casing may be a casting or a part machined from a solid block of metal and, for example, as illustrated in FIG. 6, comprises a cylindrical top portion S rising from a substantially cubical base B. However, the external shape of the casing is not essential. The body portion of the casing (FIG. 7) has a vertical bore which is coaxial with the cylindrical top S and which extends downwardly through the casing 100 and is closed, leak-tight, at its lower end by the base member 101, desirably with an O-ring 101a interposed between the base member and the lower face of the casing. The bore in the casing is such as to provide a main cylindrical inlet chamber 103 (FIG. 8) and a smaller, upper discharge chamber 104 coaxial with the chamber 103, these two chambers communicating by means of a port 105 which is defined by an annular valve seat 106. A relief port 107 extends from the chamber 104 upwardly to the atmosphere, being defined by an annular valve seat 123, the relief port 107 being coaxial with and desirably of the same diameter as the port 105.

At a level slightly below that of the valve seat 106, the wall of the casing is provided with two ports 110 and 112 which, as shown in FIG. 7, are diametrically opposite, although in the valve as actually constructed and as illustrated in FIG. 6 these ports are in the same face of the casing. The base plug of a compression fitting 111 is screwed into a screw-threaded portion of port 110, and a similar compression fitting is screwed into a screw-threaded portion of port 112. From the chamber 104 a delivery port 108 extends outwardly through the wall of the casing, this port being screw-threaded for the reception of a compression fitting 109. In the same way, at a point near the lower end of the chamber 103, the wall of the casing has a port 114 screw-threaded for the reception of the base plug of a compression fitting 115.

Referring to FIGS. 7 and 9, the numeral 116 designates a piston of an external diameter such as to slide within the chamber 103, but having a packing ring 117 to prevent leakage between the peripheral surface of the piston and the wall of the chamber. A cylindrical boss 118, coaxial with the piston, extends downwardly from the lower face of the piston, constituting a stop to limit downward motion of the piston. A cylindrical valve head 116a coaxial and integral, if desired, with the piston 116 extends up through the port 105 into the delivery chamber 104 with a slight clearance where it passes through the port 105. As here shown, the lower face of the piston is recessed so as to provide a circumferential, downwardly extending rib 119 and the upper surface contains diametrically disposed radial grooves 119'. This rib might be useful to center a compression spring (not shown) if the latter were used, with the upper coil of the spring resting upon and engaging the lower surface of the piston 116 and its lower coil resting upon and engaging the base member 101, as shown in FIG. 7. An O-ring 122 near the upper end of the cylindrical valve head 116a contacts the seat 123 and thus, for the time being, prevents leakage of pressure fluid outwardly through the port 107. In this position the bottoms of the grooves 119' are spaced below the upper wall of the chamber 103 a distance corresponding to the depth of the grooves and provide areas sufficient so that pressure fluid which enters through the port 110, for example, may flow into the space between the upper surface of the piston and the upper wall of the chamber 103, so as to exert downward pressure upon the piston. At the same time, pressure fluid may escape from chamber 103 through the port 112, the pressure fluid so escaping being conducted to the pilot valve P' (FIG. 10) by a conduit 43b shown diagrammatically connecting FIGS. 7 and 10. Pressure fluid thus admitted to the space above the piston 116 tends to force the latter down which, until pressure fluid was supplied, was retained in the position of FIG. 2 by the friction of the packing ring 117 against the wall of chamber 103. When the piston 116 moves down, the O-ring 121, which surrounds the cylindrical valve head 116a near its lower end, contacts the seat 106 and thus cuts off the flow of pressure into the annular space surrounding the cylindrical valve head 116a (and between the O-rings 121 and 122) and thus prevents its escape through the discharge port 108 while permitting it to flow out through port 112.

The elements now occupy the relative positions as diagrammatically illustrated in FIG. 2 of the drawings, wherein pressure fluid from the supply has entered the pilot valve casing P1 and holds the pilot valve block closed. The parts will remain in this position indefinitely so long as pressure fluid is supplied and so long as the pilot valve block 63 remains on its seat.

The pilot valve P' (FIG. 10) may be made as a unit separate from the main valve unit R', as in FIG. 2, or may be embodied in the signal casing with the main valve, as shown in FIG. 5.

Referring to FIG. 10, the pilot valve P' is shown as comprising a casing 40a which may be a casting or a machined part, having therein two coaxial cylindrical chambers 62 and 51a, the chamber 62 being of larger diameter than chamber 51a, the latter extending to the lower side of the casing, and the chamber 62 being closed at the top by a plate 68 containing a vent 68a. The chamber 51a houses a rigid tubular spool-valve S having a bore M and axially spaced, peripheral ribs 53 and 54, respectively, for guiding it for axial movement within the chamber 51a. The bore M of the spool-valve is open at its upper end and has a downwardly extending portion 50b for engagement by the actuating element Cb. A resilient gasket Gx', embracing the lower portion of the spool-valve is contacted, as shown in FIG. 10, by the lower radial shoulder 54 of the valve and rests upon an annular shoulder 50x of the valve casing, thus providing a leaktight joint between the rib 54 and the outer atmosphere. That part of chamber 51a between the shoulders 53 and 54 of the valve communicates with a horizontal bore 55 in the valve casing having an enlarged screw-threaded outer portion 56 which receives the screw-threaded plug 57 of a compression fitting 58 to which a conduit 49, shown diagrammatically connecting FIGS. 7 and 10, is secured, and which leads to the port 114 of the main valve R'. The spool-valve S comprises a part above the shoulder 53 which positions a compression spring 65 whose upper end contacts a resilient disc 64 secured to the lower face of the cylindrical or disc-like valve block 63. Except when lifted by the control member Cb, the upper end of the spool-valve is spaced from the disc 64, but when the spool-valve is raised to unseat the valve block 63, the disc 64 closes the bore M of the spool-valve. The valve block 63 is located in the chamber 62 and is designed to move up and down, with clearance 63a between it and the wall of the chamber. The valve block 63 has a central well 67 which receives a compression spring 66 whose lower end rests upon the bottom of the well 67 and whose upper end contacts the under surface of a cover member 68 secured to the top of the casing 40a by means of screws 69, the spring urging the valve block 63 down toward the annular seat 65a. An annular gasket 70 of resilient material seats in a recess in the upper surface of the valve body to prevent leakage between the valve body and the cover 68. An O-ring 72 of resilient material rests upon the upper surface of the valve block 63 and contacts the lower surface of the cover 68, this ring being centered, relatively to the valve block 63, by an annular rib A projecting upwardly from the top of the valve block 63 and prevents leakage between the clearance space surrounding the valve block 63 and the vent 68a in the cover 68.

A horizontal bore 73 leads to the space surrounding the valve block 63 and communicates with an enlarged bore 74 in the casing wall which is screw-threaded to receive a plug 74a provided with a nipple 75 for connection to the conduit 43b. So long as the user device does not demand pressure fluid, the spring 66 (FIG. 10) keeps the valve block 63 of the pilot valve in contact with the seat 65a, so that pressure fluid from the supply cannot escape into the lower chamber or enter the bore of the spool-valve S.

When, in response to a demand for pressure fluid by the user device, the control element Cb (FIG. 10) rises and unseats the pilot valve block 63 (FIG. 10), air escapes through vent 68a from the space above the pilot valve disc, and pressure fluid flows through bore 55 from the pilot valve casing, passes over into the casing of the main valve, and acting upon the lower face of the piston 116 (FIG. 7) quickly overbalances the downward pressure force upon the upper face of the piston, thus suddenly shifting the piston and valve head 116a to the open position shown in FIG. 7. In this position the O-ring 121 is spaced from the seat 106 and since the diameter of the port at 105 is greater than that of the cylindrical part 116a of the valve head, pressure fluid enters the discharge chamber 104 and flows out through the delivery port 108 from which it may be conducted by any suitable means (not shown) to the user device to which pressure fluid should be supplied. When the demand for pressure fluid ceases, the control element Cb will move downwardly, thus allowing the spool-valve S (FIG. 10) to move down away from the valve block 63, whereupon the pilot valve block 63 is seated by the pressure in the chamber 62. Pressure fluid trapped in the chamber beneath the piston 116 may now escape freely through the conduit 49b to the space 51a of the pilot valve and thence down through the hollow stem of the spool-valve S and through the escape port K at the lower end of the spool-valve and so to the atmosphere. The drop in unit fluid pressure below piston 116 results in immediate seating of valve head 116a. Pressure fluid trapped in the chamber 104 (FIG. 7) of the main valve will escape upwardly through the port 107 as the piston 116 is moved down by the pressure fluid acting upon the upper surface of the piston. The valve head 116a thus drops from full open to completely closed position.

The valve apparatus herein disclosed in useful in various fields, for example in refrigerating apparatus employing liquid nitrogen. Under those circumstances nitrogen vapor under pressure may be supplied to the valve inlet 110 (FIG. 7) and when the valve opens, nitrogen vapor discharged from the port 108 (FIG. 7) will be transmitted to a pressure-actuated valve (not shown) controlling the flow of liquid nitrogen to the user device.

I claim:
1. A valve assembly comprising a valve body containing a chamber and ports, one of which is adapted to admit an expandable fluid under pressure thereto and the other of which is adapted to permit the fluid to leave the chamber for expansion to a predetermined lower pressure at a place of use, said chamber having a restricted opening intermediate its ends constituting a valve seat situated between the ports, a valve element situated in the chamber between the inlet and outlet ports, said valve element embodying a part situated at the outlet side of the seat adapted, by engagement with said seat, to prevent flow of the fluid entering the inlet port from leaving through the outlet port, and a piston situated at the inlet side of the port exposed at one side to the pressure of the fluid at the inlet, said piston being adapted, when exposed to said pressure fluid, to hold the valve element engaged with said seat, conductor means connecting the portions of the chamber at opposite sides of said piston to each other, a pilot valve seat situated intermediate the ends of the conductor means, a pilot valve in said conductor means adjacent one side of the pilot valve seat, said pilot valve being adapted to be held against said seat by said pressure fluid, and means situated in the conductor means adjacent the other side of the pilot valve seat adapted to be moved in a direction to unseat the pilot valve to admit said pressure fluid to the other side of the piston, and means for disengaging said valve element from its seat when the piston is exposed at both sides to said pressure fluid.

2. A valve assembly according to claim 1, wherein the first valve seat is situated intermediate the ends of the chamber, dividing the chamber into inlet and outlet chambers, the valve element extends through the valve seat and has a valve head on the part in the outlet chamber and a piston on the part in the inlet chamber, and there is a spring in the inlet chamber situated between the piston and the distal end of the chamber which holds the valve displaced in a direction disengaged from the seat in the absence of pressure fluid at the inlet port.

3. A valve assembly according to claim 1, wherein the first valve seat divides the chamber intermediate its ends into inlet and outlet ports, the valve element extends through the seat and has a valve head on it in the outlet chamber and a piston on it in the inlet chamber, said piston being situated between the inlet port and the distal end of the inlet chamber and the means for unseating the valve element is a spring located between the piston and the distal end of the inlet chamber.

4. A valve assembly according to claim 3, wherein the first valve seat divides the chamber into inlet and outlet chambers, the valve element extends through the seat and has a head on it in the outlet chamber and a piston on it in the inlet chamber, said outlet chamber containing beyond the outlet port an exhaust port and said head has on it a part adapted to close the exhaust port when the valve element is unseated and to open the exhaust port when the valve element is seated.

5. A valve assembly according to claim 4, wherein the head has on it an O-ring yieldably engageable with the exhaust port.

6. A valve assembly according to claim 3, wherein the first valve seat divides the chamber intermediate its ends into inlet and outlet chambers, the valve element extends through the seat and has a head on it in the outlet chamber and a piston on it in the inlet chamber, and wherein said inlet chamber contains beyond the outlet port and in concentric relation to the first valve seat an exhaust port, and said head has on it axially spaced valve rings which alternately engage with the valve seat and the exhaust port.

7. A valve assembly according to claim 1, wherein the first valve seat divides the chamber intermediate its ends into inlet and outlet chambers, the valve element extending through the seat and has a head on it in the outlet chamber and a piston on it in the inlet chamber, said piston being situated between the inlet port and the distal end of the inlet chamber and the conductor means is connected to the inlet chamber at opposite sides of the piston.

8. A valve assembly according to claim 1, wherein the conductor means embodies a ported chamber connected by ports to the valve chamber, said second valve seat being situated in the ported chamber, a spring is disposed between one end of the ported chamber and the pilot valve holding the same against the seat therein, and said last means is a hollow tube supported at the opposite side of the pilot valve, said tube having a part protruding from the chamber which contains a vent opening, and said tube is movable in a direction to close the vent and unseat the valve and in the other direction to seat the valve and open the vent.

9. A valve assembly according to claim 1, wherein the valve element has on it an O-ring adapted yieldably to engage the valve seat.

10. A valve assembly according to claim 1, comprising a coiled spring at one side of the pilot valve yieldably holding the pilot valve against its seat, a hollow spindle supported at the other side of the pilot valve, said spindle having an open end adjacent the pilot valve adapted to be closed by engagement with the pilot vlave, and an opening adjacent its other end in communication with the atmosphere, said hollow spindle being movable relative to the pilot valve in one direction to lift the pilot valve from its seat and in the other direction to permit the pilot valve to be seated by means of said spring.

References Cited
UNITED STATES PATENTS

| | | | |
|---|---|---|---|
| 2,608,995 | 9/1952 | Gardner | 137—626.63 |
| 2,898,936 | 8/1959 | Collins | 137—625.63 |
| 2,913,005 | 11/1959 | Grant et al. | 137—625.6 |

HENRY T. KLINKSIEK, Primary Examiner

U.S. Cl. X.R.

137—627.5